United States Patent
Basdere et al.

(10) Patent No.: US 10,190,419 B2
(45) Date of Patent: Jan. 29, 2019

(54) METHOD FOR THE NEW PRODUCTION OF THROUGH HOLES IN A LAYER SYSTEM

(71) Applicant: SIEMENS AKTIENGESELLSCHAFT, München (DE)

(72) Inventors: Bahadir Basdere, Berlin (DE); Diana Felkel, Berlin (DE); Andrea Massa, Berlin (DE); Rolf Wilkenhöner, Kleinmachnow (DE); Adrian Wollnik, Dallgow-Döberitz (DE)

(73) Assignee: SIEMENS AKTIENGESELLSCHAFT (DE)

( * ) Notice: Subject to any disclaimer, the term of this patent is extended or adjusted under 35 U.S.C. 154(b) by 48 days.

(21) Appl. No.: 14/657,866

(22) Filed: Mar. 13, 2015

(65) Prior Publication Data
US 2015/0258634 A1 Sep. 17, 2015

(30) Foreign Application Priority Data

Mar. 14, 2014 (DE) .................. 10 2014 204 806

(51) Int. Cl.
*F01D 5/00* (2006.01)
*F01D 5/18* (2006.01)
(Continued)

(52) U.S. Cl.
CPC .......... *F01D 5/184* (2013.01); *B23K 26/0622* (2015.10); *B23K 26/384* (2015.10); *B23K 26/389* (2015.10); *B23K 26/40* (2013.01); *F01D 5/005* (2013.01); *F01D 5/288* (2013.01); *B23K 2101/001* (2018.08); *B23K 2101/34* (2018.08);
(Continued)

(58) Field of Classification Search
CPC .... B23K 26/388; B23K 26/40; B23K 26/384; B23K 26/0622; B23K 26/389; B23K 2203/26; B23K 2201/001; B23K 2203/52; B23K 2201/34; B23K 2203/18; F01D 5/184; F01D 5/005; F01D 5/288; F01D 5/186; F01D 5/823; Y10T 29/49337; F05D 2230/13
See application file for complete search history.

(56) References Cited

U.S. PATENT DOCUMENTS 5,382,133 A * 1/1995 Moore .................... F01D 5/186
 415/115
5,702,288 A * 12/1997 Liebke .................. B24B 31/116
 451/113
(Continued)

FOREIGN PATENT DOCUMENTS

DE 60316942 T2 8/2008
DE 10 2011 056 623 A1 7/2012
(Continued)

OTHER PUBLICATIONS

European Search Report, dated Jun. 22, 2015, issued in corresponding European Patent Application No. EP15152176.2. Total 6 pages.
(Continued)

*Primary Examiner* — Richard Chang
(74) *Attorney, Agent, or Firm* — Ostrolenk Faber LLP

(57) ABSTRACT

Introducing a through hole into a substrate (4) before coating, and performing the removal thereafter, shortens the machining times for producing a through hole (18) with a diffuser (13) and also subjects the intermediate layers to less stress.

11 Claims, 5 Drawing Sheets

(51) Int. Cl.
*F01D 5/28* (2006.01)
*B23K 26/382* (2014.01)
*B23K 26/40* (2014.01)
*B23K 26/0622* (2014.01)
*B23K 26/384* (2014.01)
*B23K 101/00* (2006.01)
*B23K 101/34* (2006.01)
*B23K 103/16* (2006.01)
*B23K 103/18* (2006.01)
*B23K 103/00* (2006.01)

(52) U.S. Cl.
CPC .... *B23K 2103/172* (2018.08); *B23K 2103/26* (2018.08); *B23K 2103/52* (2018.08); *B23P 2700/06* (2013.01); *F01D 5/186* (2013.01); *F05D 2230/13* (2013.01); *F05D 2260/202* (2013.01); *Y10T 29/49337* (2015.01)

(56) References Cited

U.S. PATENT DOCUMENTS

| | | | |
|---|---|---|---|
| 6,234,755 B1 | 5/2001 | Hoebel et al. | |
| 6,723,951 B1* | 4/2004 | McGraw | B23K 26/04 219/121.71 |
| 6,847,004 B2* | 1/2005 | Das | B23K 26/0622 219/121.7 |
| 7,329,832 B2 | 2/2008 | Hoebel et al. | |
| 7,622,160 B2* | 11/2009 | Gupta | C23C 4/11 427/446 |
| 8,414,264 B2* | 4/2013 | Bolms | F01D 5/005 219/121.71 |
| 2006/0157456 A1 | 7/2006 | Hoebel et al. | |
| 2007/0241084 A1* | 10/2007 | Hoebel | F01D 5/005 219/121.71 |
| 2009/0220349 A1 | 9/2009 | Bolms et al. | |
| 2012/0164376 A1 | 6/2012 | Bunker et al. | |
| 2013/0323405 A1 | 12/2013 | Burd | 427/8 |

FOREIGN PATENT DOCUMENTS

| | | |
|---|---|---|
| EP | 1 767 743 A1 | 3/2007 |
| EP | 1 844 893 B1 | 6/2009 |

OTHER PUBLICATIONS

German Search Report dated Oct. 13, 2014 issued in corresponding German patent application No. 10 2014 204 806.0.

\* cited by examiner

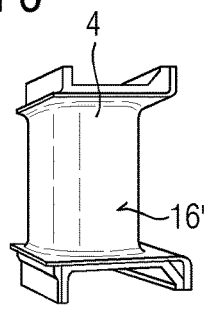
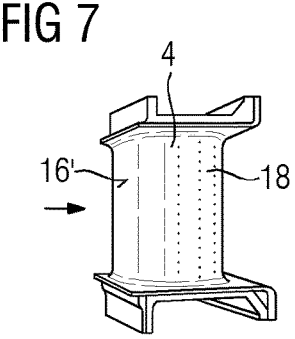
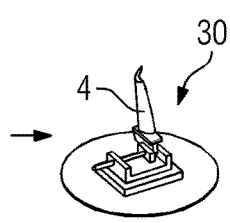
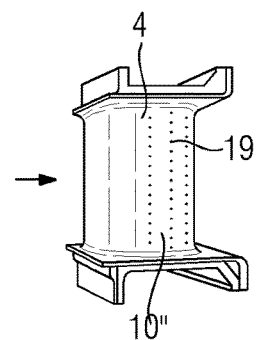
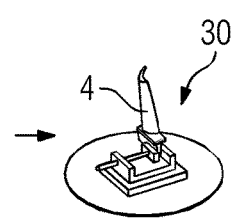
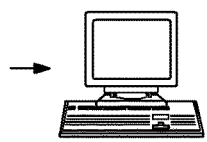
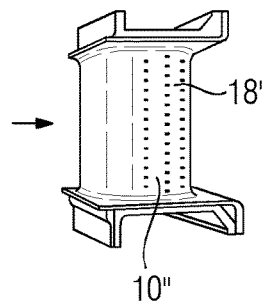

FIG 18

| material | C | Cr | Ni | Co | Mo | W | Ta | Nb | Al | Ti | B | Zr | Hf |
|---|---|---|---|---|---|---|---|---|---|---|---|---|---|
| Ni based precision casting alloys | | | | | | | | | | | | | |
| GTD 222 | 0.10 | 22.5 | Rest | 19.0 | | 2.0 | 1.0 | | 1.2 | 2.3 | 0.008 | | |
| IN 939 | 0.15 | 22.4 | Rest | 19.0 | | 2.0 | 1.4 | 1.0 | 1.9 | 3.7 | 0.009 | 0.10 | |
| IN 6203 DS | 0.15 | 22.0 | Rest | 19.0 | | 2.0 | 1.1 | 0.8 | 2.3 | 3.5 | 0.010 | 0.10 | 0.75 |
| Udimet 500 | 0.10 | 18.0 | Rest | 18.5 | 4.0 | | | | 2.9 | 2.9 | 0.006 | 0.05 | |
| IN 738 LC | 0.10 | 16.0 | Rest | 8.5 | 1.7 | 2.6 | 1.7 | 0.9 | 3.4 | 3.4 | 0.010 | 0.10 | |
| SC 16 | <0.01 | 16.0 | Rest | | 3.0 | | 3.5 | | 3.5 | 3.5 | <0.005 | <0.008 | |
| Rene 80 | 0.17 | 14.0 | Rest | 9.5 | 4.0 | 4.0 | | | 3.0 | 5.0 | 0.015 | 0.03 | |
| GTD 111 | 0.10 | 14.0 | Rest | 9.5 | 1.5 | 3.8 | 2.8 | | 3.0 | 4.9 | 0.012 | 0.03 | |
| GTD 111 DS | | | | | | | | | | | | | |
| IN 792 CC | 0.08 | 12.5 | Rest | 9.0 | 1.9 | 4.1 | 4.1 | | 3.4 | 3.8 | 0.015 | 0.02 | 1.00 |
| IN 792 DS | 0.08 | 12.5 | Rest | 9.0 | 1.9 | 4.1 | 4.1 | | 3.4 | 3.8 | 0.015 | 0.02 | 1.00 |
| MAR M 002 | 0.15 | 9.0 | Rest | 10.0 | | 10.0 | 2.5 | | 5.5 | 1.5 | 0.015 | 0.05 | 1.50 |
| MAR M 247 LC DS | 0.07 | 8.1 | Rest | 9.2 | 0.5 | 9.5 | 3.2 | | 5.6 | 0.7 | 0.015 | 0.02 | 1.40 |
| CMSX·2 | <.006 | 8.0 | Rest | 4.6 | 0.6 | 8.0 | 6.0 | | 5.6 | 1.0 | <.003 | <.0075 | 0.10 |
| CMSX·3 | <.006 | 8.0 | Rest | 4.6 | 0.6 | 8.0 | 6.0 | | 5.6 | 1.0 | <.003 | <.0075 | 0.10 |
| CMSX·4 | | 6.0 | Rest | 10.0 | 0.6 | 6.0 | 6.0 | | 5.6 | 1.0 | | Re=3.0 | 0.10 |
| CMSX·6 | <.015 | 10.0 | Rest | 5.0 | 3.0 | <.10 | 2.0 | | 4.9 | 4.8 | <.003 | <.0075 | |
| PWA 1480 SX | <.006 | 10.0 | Rest | 5.0 | | 4.0 | 12.0 | | 5.0 | 1.5 | <.0075 | <.0075 | |
| PWA 1483 SX | 0.07 | 12.2 | Rest | 9.0 | 1.9 | 3.8 | 5.0 | | 3.6 | 4.2 | 0.0001 | 0.002 | |
| Co based precision casting alloys | | | | | | | | | | | | | |
| FSX 414 | 0.25 | 29.0 | 10 | Rest | | 7.5 | | | | | 0.010 | | |
| X 45 | 0.25 | 25.0 | 10 | Rest | | 8.0 | | | | | 0.010 | | |
| ECY 768 | 0.65 | 24.0 | 10 | 51.7 | | 7.5 | 4.0 | | 0.25 | 0.3 | 0.010 | 0.05 | |
| MAR-M-509 | 0.65 | 24.5 | 11 | Rest | | 7.5 | 4 | | | 0.3 | 0.010 | 0.60 | |
| CM 247 | 0.07 | 8.3 | Rest | 10.0 | 0.5 | 9.5 | 3.2 | | 5.5 | 0.7 | | | 1.5 | chemical composition in %

120, 130

METHOD FOR THE NEW PRODUCTION OF THROUGH HOLES IN A LAYER SYSTEM

CROSS-REFERENCE TO RELATED APPLICATIONS

The present application claims priority of German Patent Application No. 102014204806.0, filed Mar. 14, 2014, the contents of which are incorporated by reference herein.

TECHNICAL FIELD

The invention relates to the production of through holes in a layer system, particularly in turbine blades.

TECHNICAL BACKGROUND

First- and second-row turbine blades are used in very high temperatures and therefore are provided, for the purpose of protection from oxidation and corrosion as well as heat, with metallic and/or thermal layers.

Turbine blades in particular have, in addition, cooling air holes, out of which cooling air flows.

The boundary surfaces of layers, between adjacent layers and with the substrate, can cause crack initiation.

On their surface on the outermost layer, these cooling air holes have a diffuser in order that a protective layer of air flows over the surface of the turbine blade. Since the diffuser represents a widening of the cylindrical lower portion, a large amount of material must be removed.

SUMMARY OF THE INVENTION

The invention thus has the object of providing a method by means of which boundary surfaces are subjected to less stress during machining than in other methods of machining. The method subjects the intermediate layer bonding between the layers and/or with the substrate to substantially less stress, and through holes can also be produced more quickly.

BRIEF DESCRIPTION OF THE DRAWINGS

In the figures:

FIGS. 6-12 show steps in a method according to the invention for the same purpose, FIG. 18 shows a list of superalloys and FIG. 19 shows a turbine blade as one example of use of the invention.

The figures and the description herein represent only exemplary embodiments of the invention.

DESCRIPTION OF A PRIOR ART EMBODIMENT

Figure 1:
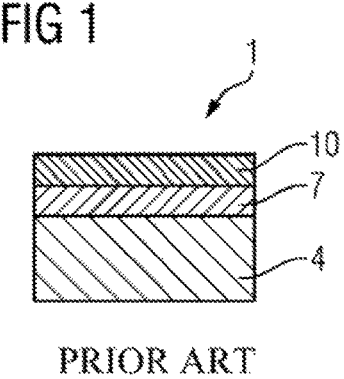
FIGS. 1, 2 and 3 show steps in a prior art method for producing diffusers.
Figure 2:
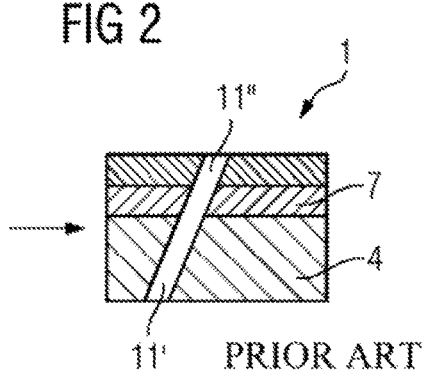
Figure 3:
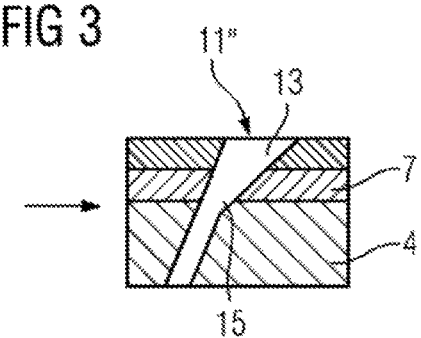

FIGS. 1-3 show a layer system 1 and a production method according to the prior art. The system in FIG. 1 has a substrate 4, with an optional inner layer 7 and an outermost ceramic layer 10.

In the case of turbine blades 120, 130 (FIG. 7), this is a metallic substrate 4, in particular a nickel- or cobalt-based alloy, most particularly, according to FIG. 18, with an optional metallic adhesion promoting layer (MCrAlX) with an optionally present aluminum oxide layer thereon and the outermost ceramic layer 10.

In order to produce a diffuser 13, first a cylindrical hole 11', 11" is created through the layers 7, 10 and through the substrate 4 as shown in FIG. 2.

The cross section of the hole 11', 11" can also be of another cross sectional shape, but it is at least constant over the entire length, as seen over the depth, after the first production step.

In FIG. 3, an upper part 11" of the through hole 11', 11" is widened in the region of the layers 7, 10 and preferably in the region of the substrate 4, such that a diffuser 13 results, as is shown in FIG. 3. The diffuser 13 can also have a diffuser portion 15 in the substrate 4.

Figure 4:
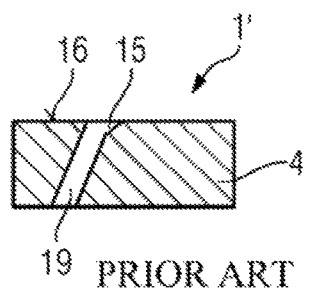
FIGS. 4 and 5 show steps in producing diffusers of the prior art.

FIG. 4 shows a component 1' post-use and once layers have been removed.

A turbine blade 120, 130 (FIG. 19) produced according to prior art FIG. 1 can, according to the prior art, be re-used after a use. In that case, first the layers 7, 10 are removed, the substrate 4 is inspected and if necessary re-worked, and then new layers 7, 10 are applied as in FIG. 5.

The substrate 4 in FIG. 4 thus already has, on its surface 16, the diffuser portion 15 of the through hole 19, which originates from the initial production of the diffuser 13 (FIG. 1).

Figure 5:
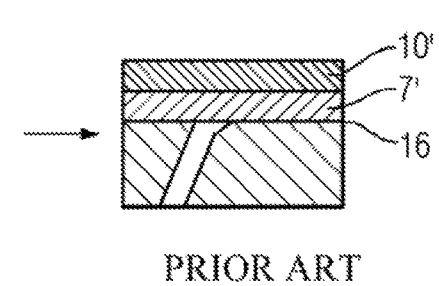

Then the layers 7', 10' are applied, which layers also deposit in the region of the diffuser (here in the region 15) as in FIG. 5. The overspray is then removed, or suitable measures are arrived at in order to protect the hole 10 by stopping it. These measures are removed after coating and the diffuser 13 is accordingly formed according to its final shape.

DESCRIPTION OF AN EMBODIMENT OF THE INVENTION

FIGS. 6-12 show a sequence according to the invention.

The substrate 4, in particular the turbine blade 120, 130, is produced new, in particular is cast (FIG. 6).

Figure 13:
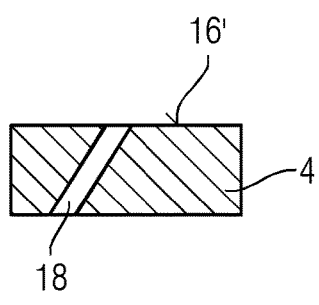
FIGS. 13-15 show sectional views of stages in the method.

In a second step, through holes 18 are introduced into the substrate 4 (FIGS. 7 and 13).

The through holes 18 do not yet have a diffuser on the outer surface 16', if one is to be produced. They have a constant cross section over their depth, in particular a cylindrical shape.

Optionally, in the intermediate step, the bored substrate 4 is blasted with material, in particular with sand, silicon carbide balls (SiC) or steel balls (not shown).

This serves as activation for a subsequent coating and also to deburr the bored through holes 18.

In a further step in FIG. 8, in a first scan by means of a scanning device 30, the position and the orientation of the through holes 18 and thus those of a hole pattern are determined and, in particular, are saved.

Figure 14:
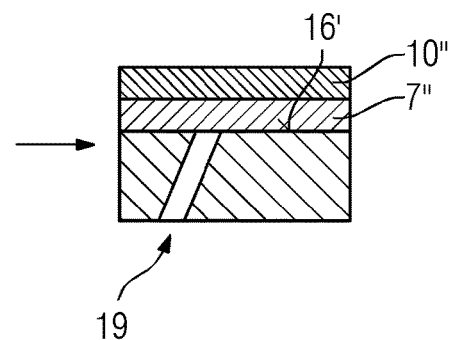

The coating is then carried out with an optional metallic adhesion promoter layer 7" in FIG. 14, in particular an MCrAlX (M=Ni, Co; X=Y, Ta, Re, Si and/or Fe) layer and an outer ceramic layer 10".

Preferably, a metallic coating 7" is first applied, in particular by means of LVPS, HVOF or APS.

Optionally, metallic material is removed and the coated holes 19 are opened (FIGS. 9 and 14), in particular manually, most particularly with a diamond file (not shown).

The ceramic coating 10" in FIG. 14 is then carried out, in particular by means of APS.

In the process, the holes 19 are also at least partially or entirely coated.

There follows a second scan in FIG. 10 in which the holes 19 on the surface of the coated substrate 4 are detected and determined and, by comparing data (FIG. 11) with the first scan (FIG. 8) or by means of a further testing method, the position and orientation of the holes 18, 19 is determined.

Then, ceramic material is removed from the through hole 18. (FIG. 16) by means of a laser. This produces through holes without a diffuser.

Preferably, in the same device, there is first created an outer diffuser 13' (FIG. 15) which has a widening of the cross section of the through hole 18, in particular in the layers 7", 10". This can be brought about in a further machining step or in a process step with the removal of ceramic material.

Figure 15:
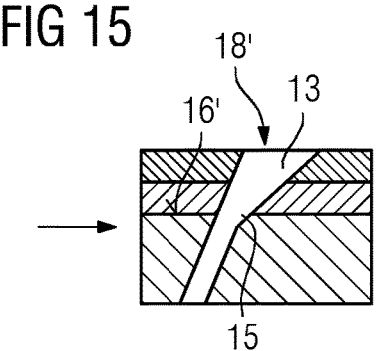

A method according to the invention for the new production of a through hole 18' with a diffuser 13 (FIG. 12) is shown, shortened, in FIGS. 13-15.

Figure 16:
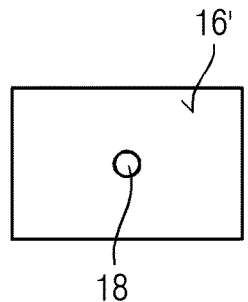
FIGS. 16 and 17 show top views of the diffuser according to the method.

A through hole 18 is produced in the substrate 4 in FIGS. 13 and 16, which hole is in particular rotationally symmetric or has a constant cross section as seen over its depth. This can be brought about by EDM or laser machining.

However, in FIG. 13 the substrate 4 has no widening in the region of its surface 16', as is the case of the refurbished component 1' as shown in FIG. 4.

Only then are layers 7" (metallic, most preferably MCrAlX) and 10" (ceramic) applied (FIG. 14).

The material of the layers 7", 10" enters into the hole 18.

Then, at least the ceramic material is removed from the through hole 19.

Preferably, the diffuser 13 is then created through these layers 7", 10" (FIGS. 15 and 17) and for the first time a diffuser portion 15 of the diffuser 13 is also created in the substrate 4, that is to say material of the substrate 4 is removed for the diffuser 13.

This is brought about preferably by laser machining.

Figure 17:
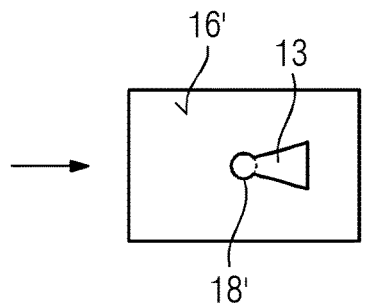

A view onto the surface 16' is shown in FIGS. 16 and 17. FIG. 16 shows the original profile (FIG. 16) of the through hole 18 on the surface 16' before widening, shown in FIG. 17, for producing the diffuser 13.

The through hole 18 is preferably produced using pulse durations in the millisecond range, in particular with pulse durations ≥1 ms.

Pulse durations in the nanosecond range or the sub-nanosecond range, in particular less than or equal to 800 ns, most particularly less than or equal to 600 ns, are used to create the diffuser 13 or at least to remove the ceramic layers and to create the part 15.

Figure 19:
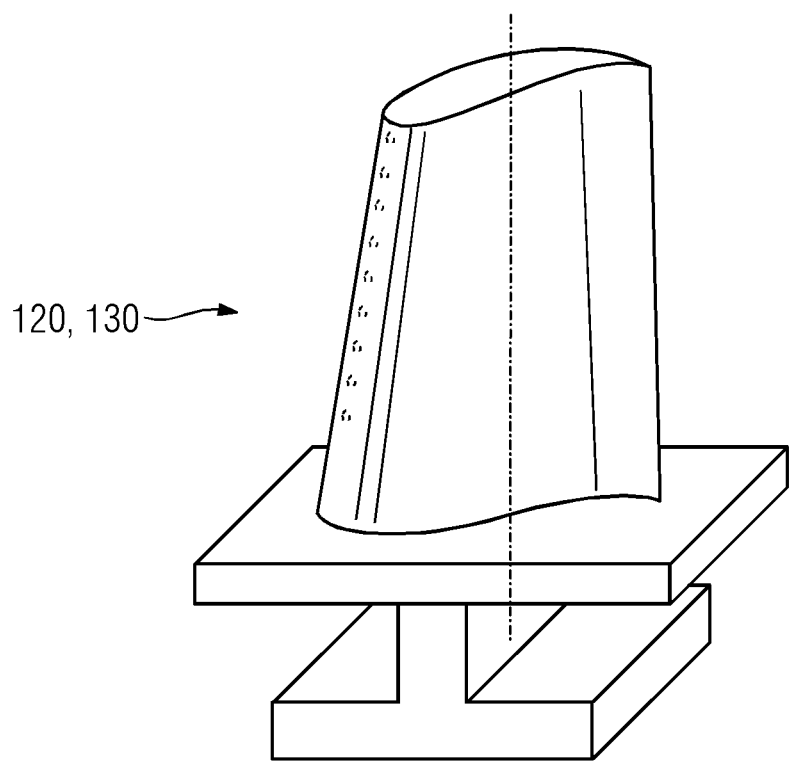

Such a component 1, 120, 130 (FIGS. 1 and 19) preferably has a nickel- or cobalt-based superalloy, in particular as shown in FIG. 18, and preferably represents a turbine blade 120, 130 as shown in FIG. 19.

A technical challenge with this new process chain is to locate the already-introduced cooling air bores for the subsequent laser shaping and/or laser re-opening of the cooling air bores with such precision that an unacceptable offset between the through bores and the funnels of the film cooling bores does not occur. Currently, at least two possibilities are envisaged to permit this re-location:

1) Manual setup before the laser shaping, in particular by approaching all or optionally a certain number of bores per bore row or bore pattern with a camera system. In the process, the bore coordinates of the approached holes are recorded, and—if necessary—the coordinates of the other holes are determined by interpolation.

2) Measuring the bore pattern and transferring the bore coordinates to the laser shaper. This can preferably be brought about by means of structured light projection. To that end, the blade geometry is measured after boring the cylindrical bores and after coating. By means of a best-fit approach, these two measurements are used to determine both the borehole coordinates and the bore angles, which are then delivered to the laser shaper. The boring program for the laser shaping/laser re-opening is then established with the aid of these data.

The inventive step resides on one hand in the fact that the cylindrical through bores 18 are introduced before the ceramic thermal barrier layers 10" are applied, such that the thermal barrier layer is not damaged by the introduction process. The funnel-shaped cooling air bores 19 are introduced only by means of substantially reduced-energy laser shaping and—if necessary—ceramic coatdown is removed from the through bores 19.

A further inventive step resides in that fact that the real bore pattern is determined by means of a measurement, in particular by geometry determining before and after coating. The actual position and the angle of each individual through hole 18 are delivered to the laser shaper, such that there is no unacceptable offset between the through bore and the film cooling funnel. In addition, possible manufacturing-related discrepancies between the 3D model and the real position of the bores are thus detected and taken into account.

Further inventive steps reside in using the activation treatment prior to coating (sand blasting) also for cleaning and deburring purposes after laser boring.

The invention claimed is:

1. A method for production of a component, the method comprising:

producing a substrate by casting;

producing a plurality of spaced through holes arranged in a hole pattern across a thickness of the substrate, each of the plurality of spaced through holes having a constant cross section over an entire thickness of the substrate;

scanning the hole pattern of the plurality of spaced through holes in a first scan with a scanning device to obtain a scanned hole pattern;

saving the scanned hole pattern of the first scan;

coating the substrate, and at least partially the plurality of spaced through holes, with a metallic material to obtain an inner metallic layer after the first scan;

removing from the plurality of spaced through holes the metallic material;

coating the inner metallic layer with an outer ceramic layer to obtain a coated outer ceramic layer after removing from the plurality of spaced holes the metallic material;

scanning and saving another hole pattern of holes on a surface of the substrate in a second scan after coating the inner metallic layer with the outer ceramic layer to obtain another scanned hole pattern;

by comparing the scanned hole pattern and the another scanned hole pattern, at least identifying the plurality of spaced through holes and determining orientations and positions of the plurality of spaced through holes; and forming diffusers into the coated outer ceramic layer and the inner metallic layer, each diffuser being associated with a respective one of the plurality of spaced through holes.

2. The method as claimed in claim 1, wherein the removing is performed manually.

3. The method as claimed in claim 1, wherein each diffuser includes a portion that is an asymmetric widening of an upper part of a respective one of the plurality of spaced through holes.

4. The method as claimed in claim 1, wherein the plurality of spaced through holes are produced in the substrate by machining.

5. The method as claimed in claim 1, further comprising using a laser removal method comprising substantially at least 20% different pulse frequencies for producing the plurality of spaced through holes and forming the diffusers.

6. The method as claimed in claim 5, further comprising producing the plurality of spaced through holes using pulse durations in the millisecond range.

7. The method as claimed in claim 1, wherein material is removed by laser pulses with pulse durations in the nanosecond range or the sub-nanosecond range to form the diffusers or to remove material from the plurality of spaced through holes.

8. The method of claim 1, further comprising performing a material-blasting process comprised of sand blasting or shot peening after the producing of the plurality of spaced through holes.

9. The method of claim 1, wherein the diffusers extend into the substrate.

10. The method of claim 1, further comprising removing at least ceramic material from the plurality of spaced through holes in order to finish the through holes.

11. The method of claim 10, wherein a laser with at least 20% different pulse frequencies is used to remove the ceramic material.

* * * * *